(12) United States Patent
Bergreen et al.

(10) Patent No.: US 10,536,181 B2
(45) Date of Patent: Jan. 14, 2020

(54) PROVIDING A SEAL FOR A PROTECTIVE MOBILE DEVICE CASE

(71) Applicant: Hit Technologies Inc., Vancouver (CA)

(72) Inventors: Brooks Bergreen, Vancouver (CA); David Keddie Brown, Vancouver (CA); Lixin Deng, Shenzhen (CN); Xiuhong Deng, Shenzhen (CN)

(73) Assignee: HIT TECHNOLOGIES INC., Vancouver (CA)

( * ) Notice: Subject to any disclaimer, the term of this patent is extended or adjusted under 35 U.S.C. 154(b) by 0 days.

(21) Appl. No.: 15/625,004

(22) Filed: Jun. 16, 2017

(65) Prior Publication Data
US 2017/0366217 A1   Dec. 21, 2017

Related U.S. Application Data (60) Provisional application No. 62/351,210, filed on Jun. 16, 2016.

(51) Int. Cl.
| | | |
|---|---|---|
| *H04B 1/3888* | (2015.01) | |
| *G06F 1/16* | (2006.01) | |
| *H04M 1/18* | (2006.01) | |

(52) U.S. Cl.
CPC ......... *H04B 1/3888* (2013.01); *G06F 1/1633* (2013.01); *H04M 1/18* (2013.01); *G06F 1/1626* (2013.01); *G06F 2200/1631* (2013.01); *G06F 2200/1633* (2013.01); *H04M 2250/22* (2013.01)

(58) Field of Classification Search
CPC ............................ H04B 1/3888; G06F 1/1633
USPC .................................. 455/575.8, 575.1, 90.3
See application file for complete search history.

(56) References Cited

U.S. PATENT DOCUMENTS

| | | | |
|---|---|---|---|
| 9,549,598 B2* | 1/2017 | Rayner | A45C 13/008 |
| 2014/0268516 A1* | 9/2014 | Fathollahi | A45C 11/00 |
| | | | 361/679.01 |
| 2014/0268519 A1* | 9/2014 | Huang | H04B 1/3888 |
| | | | 361/679.01 |
| 2016/0234356 A1* | 8/2016 | Thomas | H05K 9/0069 |
| 2017/0237460 A1* | 8/2017 | Rayner | H04B 1/3888 |
| | | | 455/575.8 |
| 2017/0258191 A1* | 9/2017 | Poon | A45C 11/00 |

* cited by examiner

*Primary Examiner* — John J Lee
(74) *Attorney, Agent, or Firm* — Palmer IP Inc.

(57) ABSTRACT

A protective case, sized and shaped to encase a mobile device such as a smartphone or a tablet computer, includes a top section and a bottom section. The top section and bottom section are capable of being engaged to one another in a closed relationship, in which the mobile device may be hermetically sealed or isolated from the outside environment. The top section and bottom section may be readily engaged to or disengaged from one another. Embodiments of the protective case may include membrane that includes a first membrane portion and a second membrane portion, the membrane portions having different qualities.

12 Claims, 6 Drawing Sheets

PROVIDING A SEAL FOR A PROTECTIVE MOBILE DEVICE CASE

REFERENCE TO PENDING APPLICATIONS

This patent application is related to, and incorporates by reference, U.S. Pat. No. 9,127,806 issued Sep. 8, 2015 and entitled, "Providing a Rail Mounting System for a Mobile Device Case;" U.S. Pat. No. 8,770,402 issued Jul. 8, 2014 and entitled, "Waterproof Protective Case for a Mobile Device;" U.S. patent application Ser. No. 13/441,564 filed Apr. 6, 2012 and entitled, "Mobile Device Case Having an Integrated Wide-Angle Lens;" U.S. patent application Ser. No. 14/921,566 filed Oct. 23, 2015 and entitled, "Dual Lens Mount on a Mobile Device Case;" U.S. patent application Ser. No. 14/990,754 filed Jan. 7, 2016 and entitled, "Systems for Securing a Mobile Device in a Waterproof Case;" U.S. patent application Ser. No. 29/528,839 filed Jun. 1, 2015 and entitled, "Shield for a Mobile Device Case;" and U.S. patent application Ser. No. 14/831,470 filed Aug. 20, 2015 and entitled, "Providing a Rail Mounting System for a Mobile Device Case."

TECHNICAL FIELD

This disclosure relates generally to portable containers configured to hold and protect mobile devices such as portable electronic devices.

BACKGROUND

Mobile devices are a part of modern life. Typical mobile devices are not only portable, but are also typically readily moved from place to place and are often capable of being used while moving around. Examples of mobile devices include portable electronic devices such as smartphones, cell phones, pagers, portable media players, tablet computers, GPS/mapping devices, game controllers, cameras, and remote controls. Such devices may be handheld, that is, sized and shaped to be held in a human hand, and typically operated while held. Such devices may have a multiplicity of uses, such as for business, personal, military, or industrial matters. Mobile devices may readily be carried from place to place and may be subjected to a number of environmental concerns, such as air or water or dust or abrasions or impacts. The environmental concerns may adversely affect the use of the mobile device.

DETAILED DESCRIPTION

This concept described herein is directed toward a protective case with a waterproof sealing system for a mobile device. In an exemplary embodiment, the protective case includes a top section and a bottom section, the top section configured to form a waterproof seal with the bottom section. A sealing channel may also be included. The protective case may have a screen (or transparent or translucent membrane) embedded or attached to either or both the top section and the bottom section. This screen may be a touchscreen. In other embodiments, the protective case may not have a screen.

The top section, may, in various embodiments, be comprised of four sides and a cover, the four sides and the cover configured to create a first housing. In alternative embodiments, however, any suitable number of sides may be included (e.g., three sides, five sides, etc.), though four sides may be advantageous to avoid unnecessary bulk. Additionally, the top section may comprise an upper rim encircling at least a portion of an outer edge of the top section. The bottom section may, in some embodiments, be comprised of four sides and a backing, the four sides and the backing configured to create a second housing. As earlier discussed, in other embodiments, any suitable number of sides may be provided. In addition, the bottom section may comprise a lower rim encircling at least a portion of an outer edge of the bottom section. On a periphery of the first housing is a coupling flange that may be mounted on a periphery of the second housing, creating the waterproof sealing system. The waterproof sealing system may be engaged with the top and bottom sections are press-mounted to each other.

In some embodiments, at least one seal contact bead is located on at least one of the top section or the bottom section of the case. The seal contact beads provide for a stronger waterproof sealing system when greater external pressure on the protective case is applied (e.g., the mobile device (enclosed by the protective case) is underwater). Either or both the cover of the top section and the backing of the bottom section may be transparent or opaque, and allow for interaction by the user with the mobile device. The cover and the backing may be integrated into the top section and the bottom section, respectively. Alternatively, the cover and the backing may be implemented as a separate element affixed to the top section and the bottom section, respectively.

The protective mobile device case may be of any appropriate size to receive and encase the mobile device. The top section and the bottom section of the protective mobile device case may also be composed of any suitable material and/or combination of materials, such as plastic, metal (e.g., aluminum), and rubber. In various embodiments, the protective mobile device case may be made of waterproof material. In some embodiments, the protective mobile device case may be designed to float on water, which may be advantageous to further reduce exposure of the mobile device case to liquid and thereby increase the useful life of the mobile device case. The figures submitted herewith are embodiments of the disclosed invention.

Figure 1:
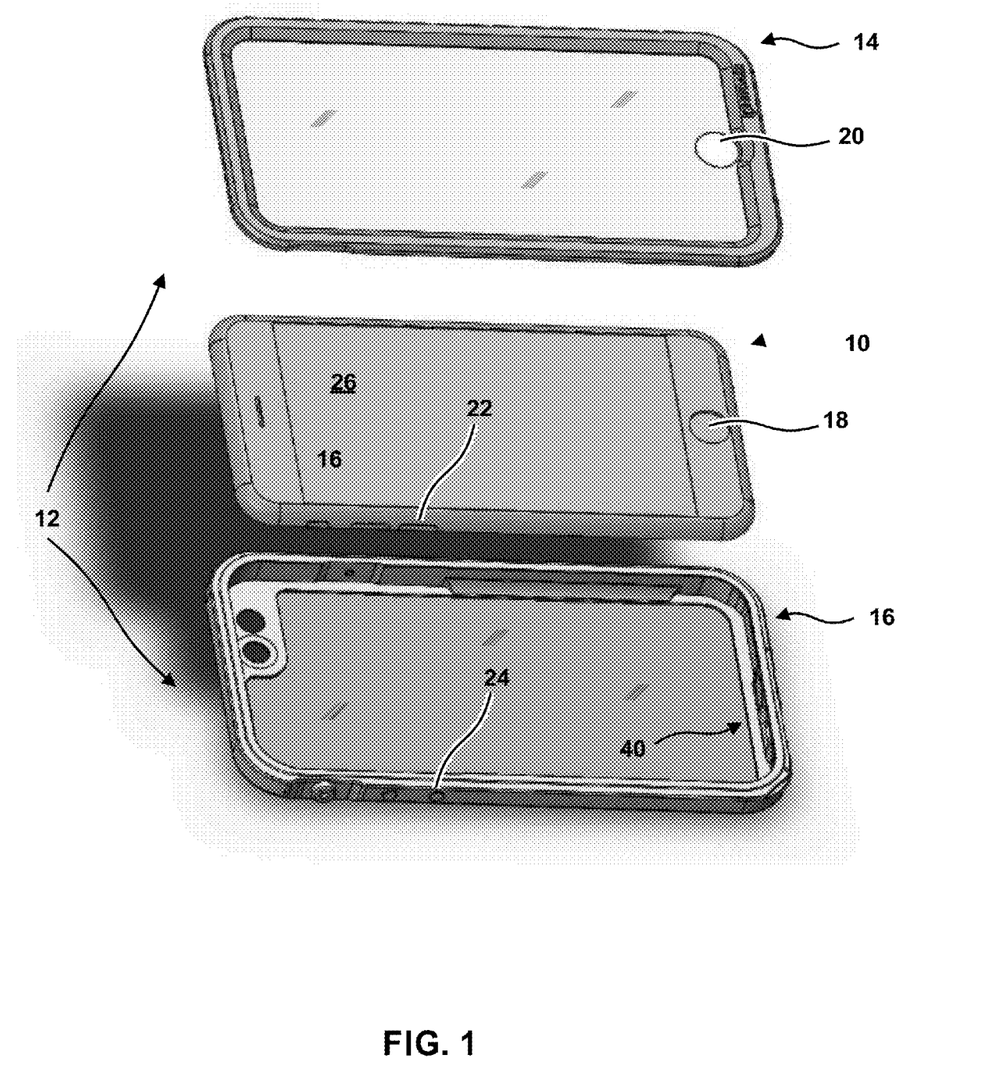
FIG. 1 is an exploded view of a protective case sized and shaped to receive and encase an illustrative mobile device.

FIG. 1 shows an illustrative mobile device 10. In FIG. 1, the illustrative mobile device 10 is a smartphone, but the concepts described herein can be adapted to a variety of mobile devices. The mobile device 10 may include a number of input/output (I/O) features, which are structures by which a user or another entity can interact with the mobile device 10. Examples of I/O features in a smartphone may include, but are not limited to, one or more of: a button, a switch, a touchpad, a touchscreen, a display element (such as a display screen or liquid crystal display readout), a speaker, a microphone, a transceiver, wireless charging apparatus, a camera, an illumination source, a fingerprint scanner, a port (such as a Universal Serial Bus (USB) port or a headphone port), and/or an environmental sensor—such as a temperature sensor, an orientation sensor, a magnetic sensor, a light sensor, a pressure sensor. It is generally desirable for a protective case to afford protection from environmental concerns, while also affording uninterrupted input and output through the I/O features.

It may further be desirable for a protective case to be configured to encase the mobile device 10 relatively readily, typically without a need for tools. Once encased, it is desirable that some intentional effort be needed to release the mobile device 10 from the protective case; in other words, is undesirable that the mobile device 10 would disengage from the protective case inadvertently. Further, it is generally desirable that the mobile device 10 be capable of being disengaged from the protective case through application of the intentional effort; in other words, it is generally undesirable that the mobile device 10 be encased by the protective case permanently or that disengagement of the mobile device 10 and the protective case require the use of tools. Circumstances in which it may be desirable to disengage the mobile device 10 from the protective case may be, for example, to replace a power supply or to install a memory element or insert a subscriber identification module (SIM) card. Operations such as these may not be carried out on a frequent basis, but it is desirable that the mobile device 10 be capable of being disengaged from the protective case so that they can be performed if desired. Still further, it is generally desirable that, after the mobile device 10 has been disengaged from the protective case, that mobile device 10 can be reengaged with the protective case and encased by the protective case once again. Yet further, it is generally desirable that the protective case itself cause no damage to mobile device 10 in the course of ordinary usage.

While encased in the protective case the mobile device 10 may retain most or all functionality. The mobile device 10 also may be fully or partially protected from environmental concerns, such as water or dust or abrasions or impacts. Without such protection, environmental concerns may affect the functionality of the mobile device 10, or may affect the aesthetic qualities of the mobile device 10.

FIG. 1 shows an illustrative protective case 12. The protective case 12 includes a top section 14 and a bottom section 16. The protective case 12 shown in FIG. 1 is sized and shaped to receive and encase the mobile device 10, and may be customized to fit and work with the particular mobile device 10 (or the particular model of mobile device) shown in FIG. 1; a different style of protective case—with a different shape, different dimensions, different features or features arranged in a different manner—may be customized for a mobile device of a different kind. In FIG. 1, for example, the mobile device 10 may include a home button 18 (an illustrative input/output device that may, when activated, display a home screen, or take a user to a starting point, or undo an operation, or detect a user's fingerprint, for example). The top section 14 includes a home button feature 20, which will be described in more detail below, that corresponds to the home button 18. When the mobile device 10 is encased in the protective case 12, the home button feature 20 is disposed adjacent to the home button 18, and may enable a user to activate the home button 18 without actually touching the home button 18. Similarly, the mobile device 10 may include a control switch 22 (an illustrative input/output device that may, when activated, change the volume of audio output, or turn off a device, or take a picture with a camera, for example). The bottom section 16 includes a control switch feature 24, which will be described in more detail below, that corresponds to the control switch 22. When the mobile device 10 is encased in the protective case 12, the control switch feature 24 is disposed adjacent to the control switch 22, and may enable a user to activate the control switch 22 without actually touching the control switch 22.

Although FIG. 1 depicts the control switch feature 24 as a component of the bottom section 16, some embodiments of the protective case 12 may include a control switch feature 24 as a component of the top section 14. Further, additional embodiments may include multiple control switch features, which may be disposed on the top section 14, or the bottom section 16, or both sections.

As shown in FIG. 1, the illustrative mobile device 10 includes a display 26. The display 26 may be an output device that presents visual data to a user. The display 26 may also be touchscreen or other input device that receives input from touch, pressure, capacitance or other input. When the mobile device 10 is encased in the protective case 12, it is desirable that the output capability (and input capability, if any) be generally unimpeded by the protective case 12.

The use of the terms "top" and "bottom" is a matter of convenience; words such as "front" and "back"—or "first" and "second!"—could also be used. A user of a mobile device 10 may regard one of the broad surfaces of the mobile device 10 as the "top," in the sense that this is the surface with which most interaction occurs, or that the "top" surface is the surface that is exposed when the mobile device 10 rests flat on a table. An important input/output device such as a home key 18 might be conventionally thought of as being on the "top" side of the mobile device 10. A user may likewise regard the opposing broad surface as the "bottom." What constitutes the "top" and "bottom" of a particular mobile device is, however, a matter of convenience. Similarly, identification of which of the opposing sections of a protective case 12 is "top" or "bottom" is a matter of convenience. In general, when the mobile device 10 is encased in the protective case 12, the top section 14 of the protective case 12 is proximate to the top side of the mobile device, and the bottom section 16 of the protective case 12 is an opposing section that is proximate to the bottom side of the mobile device.

Further, in the discussion that follows, some features may a part of the top section 14 or the bottom section 16, or in some cases, both sections.

Figure 2:
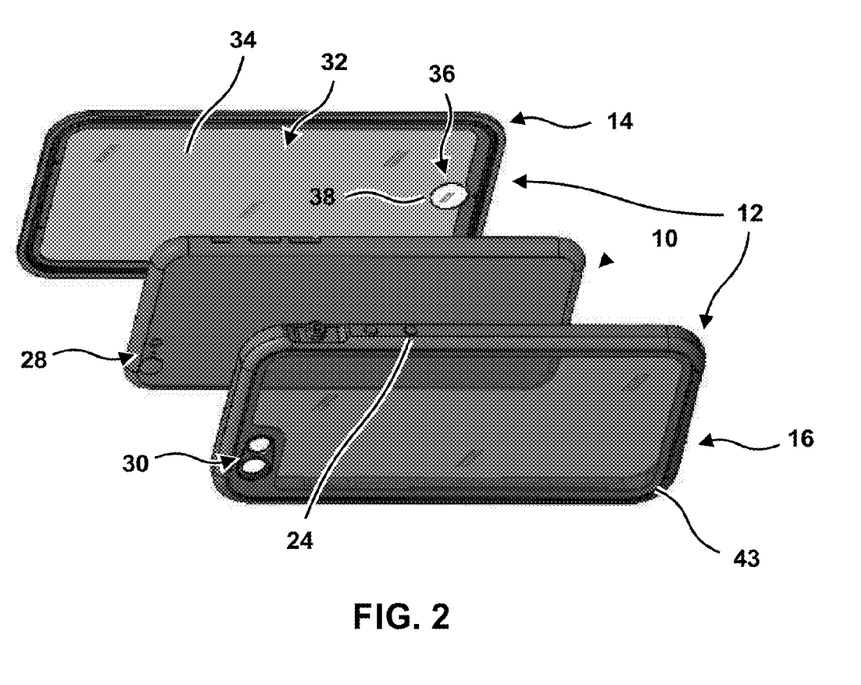
FIG. 2 is an alternative exploded view of a protective case sized and shaped to receive and encase an illustrative mobile device.

FIG. 2 is an alternative view of illustrative mobile device 10 and protective case 12. In FIG. 2, mobile device is shown to have a camera assembly 28, which may include a camera lens, a light source and a light sensor. The bottom section 16 includes a camera assembly feature 30, which may comprise one or more ports. The camera assembly feature 30 typically represents a transparent portion of the protective case 12, through which the camera assembly 28 may operate while the mobile device is encased in the protective case 12. When the mobile device 10 is encased in the protective case 12, the camera assembly feature 30 is disposed adjacent to the camera assembly 28, and may enable a user to use the camera assembly 28 without removing the mobile device 10 from the protective case. In some embodiments, other portions of the bottom section 18 may be transparent, making a distinct camera assembly feature 30 unnecessary. (In FIG. 2, the sides of the bottom section 16 are depicted as opaque, but the backing is depicted as transparent or translucent. Transparency or translucency of part of all of the bottom section 16 may be desirable in that transparency enables the mobile device 10, which may have aesthetic qualities, to be seen.) In still further embodiments, the camera assembly feature 30 may include various physical features such as sockets or mounts, sized and shaped to be points of attachment for camera-related accessories such as special lenses.

As shown in FIG. 2, the top section includes a top section membrane 32. The top section membrane 32 may comprise a single homogenous layer, having uniform qualities. Qualities of the top section membrane 32 may include transparency, thickness, flexibility, resilience, construction materials, electrical conductivity, thermal conductivity, and so forth. The top section membrane 32 may be constructed from polycarbonate, polyethylene terephthalate (PET), vinyl, polysulfone, ultem, or other similar materials. Such materials may be thin enough that the top section membrane 32 does not prevent the function of an adjacent capacitive touch screen on a mobile device 10. Such materials may also be configured to allow biometric passthrough (enabling the reading of a fingerprint, for example). The membrane 32 may have a hard coating on one or both sides to resist scratches.

As illustrated in FIG. 2, the top section membrane 32 includes a main membrane section 34 and a home button membrane section 36 (which is part of the home button feature 20). The home button membrane section 36 may be physically coupled to the main membrane section 34 by a border attachment 38. The border attachment 38 may bind the main membrane section 34 to the home button membrane section 36 such that there is a hermetic seal of the main membrane section 34 and the home button membrane section 36, making it seem as though the main membrane section 34 and the home button membrane section 36 are a unitary structure. (In general, one structure is unitary with another when the two structures are not separately formed and joined together to form a single piece. In the case of the top membrane section 32, the main membrane section 34 and the home button membrane section 36 may have the appearance of being unitary, though they may be distinct and separate structures joined together.) FIG. 2 shows the main membrane section 34 and the home button membrane section 36 as close to one another, but in some embodiments, the membrane sections 34 and 36 may be further apart than is depicted, and in some embodiments the border attachment 38 may appear to separate the membrane sections 34 and 36 further than is shown. In some embodiments, the main membrane section 34 and the home button membrane section 36 have distinct qualities, even if they appear to be a unitary structure. For example, the home button membrane section 36 may be thinner than the main membrane section 34 or made of a different material, such that a fingerprint may be more easily scanned through the home button membrane section 36 than could be done through the main membrane section 34.

Border attachment 38 may be constructed in any of several ways. In one example, two membrane materials having different qualities may be hermetically joined to one another by an adhesive. In another example, two membrane materials may be joined (e.g. by an adhesive) to an intermediary element (such as a plastic or metal ring), creating a hermetic seal. In another example, two membrane materials may share a common layer, and the border attachment 38 may be the place at which the other components of the membranes are discontinuous. In a further example, two membrane materials may be hermetically joined by heating, or crimping, or mechanical attachment.

When the mobile device 10 is encased in the protective case 12, the display 26 of the mobile device 10 may be adjacent to the main membrane section 34. The main membrane section 34 may have qualities that enable a user to use the display 26 (e.g., transparency so that visually displayed data are visible, or or flexibility or conductivity so that touch inputs may be recognized). When the mobile device 10 is encased in the protective case 12, the home button 18 may be adjacent to the home button membrane section 36. The home button membrane section 36 may have qualities that enable a user to use the home button 18 (e.g., have a fingerprint detected or read).

The top section 14 and the bottom section 16 are configured to (or are adapted to) assume an open relationship or a closed relationship. In a closed relationship, the top section 14 and the bottom section 16 are physically joined (or attached to or sealed to or engaged with) one another, creating a void that is sized to contain the mobile device 10. As will be described in more detail below, the mobile device 10 can be encased in the protective case 12 by attaching the top section 14 to the bottom section 16. The top section 14 and the bottom section 16 may be attached to one another relatively readily, without a need for tools; and once attached, the top section 14 and the bottom section 16 make up a protective case 12 that affords protection to the mobile device 10 from environmental concerns. The top section 14 and the bottom section 16 may be considered to be removably attached or engaged to one another, in that the attachment is not permanent; rather, the top section 14 and the bottom section 16 may be detached or disengaged without a need for tools but with the application of some intentional effort to detach the top section 14 from the bottom section 16.

When the top section 14 and the bottom section 16, when in the closed relationship, are typically hermetically sealed to one another. Consequently, air (or other matter) from the outside environment may be prevented from entering the void. In some embodiments, the seal may be water-resistant or waterproof. The hermetic seal can protect a mobile device 10 that occupies the void and that is encased inside the protective case 12 from the outside environment.

Figure 3:
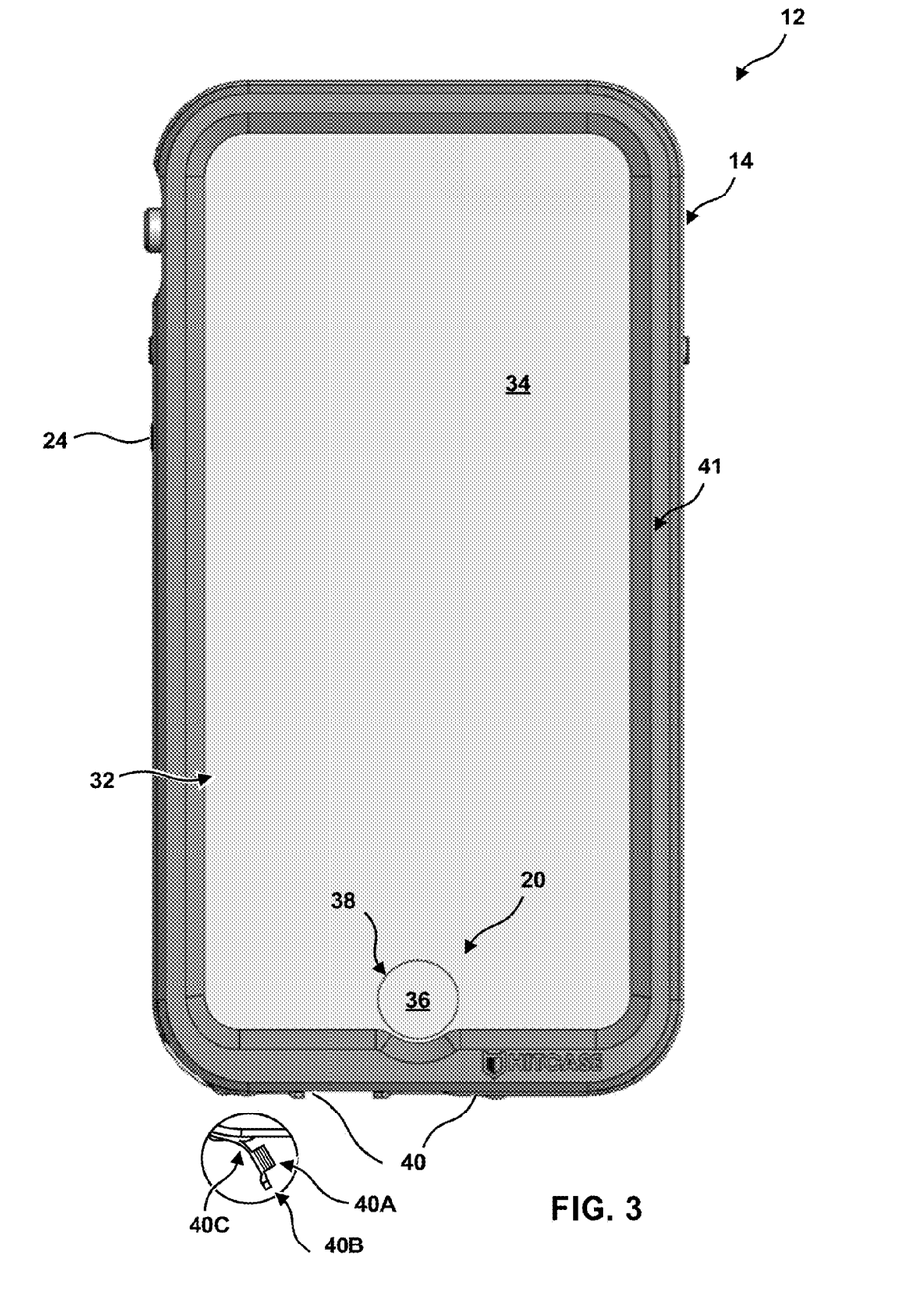
FIG. 3 is a plan view of an illustrative protective case.

FIG. 3 is a plan view of a protective case 12. In FIG. 3, the top section 12 represents most (but not necessarily all) of the visible portion of the protective case 12. Certain elements (such as camera assembly feature 30) are not shown in FIG. 3.

FIG. 3 illustrates one or more interface cover tabs 40. In the illustrative protective case 12, interface cover tabs 40 can be included in either the top section 14 or the bottom section 16 or both. For purposes of discussion, it will be assumed that the interface cover tabs 40 are included in the bottom section 16 (as illustrated in FIG. 1). The interface cover tabs 40 are disposed to correspond to the location on the mobile device 10 of any kind of physical input/output port, such as a Universal Serial Bus (USB) port or a headphone port, to which any kind of connector may be attached. Openings in the bottom section 16 supply access to the ports, enabling a user to attach a connector to a port without removing the mobile device 10 from the protective case 12. When no connector is attached to a port, the opening may be sealed by an interface cover tab 40. The seal may be hermetic.

A typical interface cover tab 40 (shown in inset in FIG. 3, removed from the corresponding opening) may include a plug portion 40A, sized to seal the opening hermetically. Plug portion 40A may be sized or shaped to afford different degrees of sealing. A typical interface cover tab 40 may also include a grip portion 40B, which may be the part of the interface cover tab 40 that the user may manipulate, such as with a hand or a fingernail, and which the user may manipulate to seal or unseal the opening. A typical interface cover tab 40 may also include a hinge portion 40C, which physically connects the interface cover tab 40 to the rest of the protective case 12. The hinge portion 40C not only enables the plug portion 40A to seal and unseal the opening, but may also keep the plug portion 40A proximate to the opening and may reducing the risk that the interface cover tab 40 or the plug portion 40A may be inadvertently misplaced.

By comparison, a control switch feature 24 need not relate to any opening in the protective case 12. A typical control switch feature 24 would be of unitary construction with, or hermetically sealed to, the portion of the section of which it is a part; that is, a control switch feature 24 and the portion of the section surrounding the control switch feature 24 would not have any opening associated with the control switch feature 24, but would be airtight. The control switch feature 24 may also be waterproof. In some embodiments, the control switch feature 24 would have a unitary construction with part or all of the section that includes the control switch feature 24. In general, a control switch feature 24 may include an elastomeric connection to the protective case 12, such that, when depressed by a user, the control switch feature 24 causes at least a portion of the protective case 12 to deform and/or bear against a control switch 22 on the mobile device, thereby activating the control switch 22.

As illustrated in FIG. 3, the top section membrane 32 may be thought of as disposed toward the centre of the top section 14. The periphery of the top section 14, encircling the top section membrane 32 (or encircling the outer edge of the top section 14), may be thought of as the upper outer rim 41. The qualities of the outer rim 41 are topically different from the qualities of the top section membrane 32. The outer rim 41 may be constructed of any combination of elastomeric, semi-rigid, or rigid materials, such as thermoplastic polyurethane, thermoplastic copolyester, thermoplastic polyamide, polydimethylsiloxane, polycarbonate, polyoxymethylene, polyamide, or metals or alloys such as aluminum, stainless steel, steel, titanium, and magnesium. Any elastomeric, semi-rigid, or rigid object may be formed into a shape in any of several ways, such as by molding, extruding, cutting, or 3-D printing.

In a similar way, the periphery of the bottom section 16 may be thought of as a lower outer rim 43 (see, e.g., FIG. 2), and similar materials may be used for construction. In some typical embodiments, the upper outer rim 41 of the top section 14 and/or the lower outer rim 43 of the bottom section may include structures that form the sides of the protective case 12. The upper outer rim 41 of the top section 14 and/or the lower outer rim 43 may act as a frame for the protective case 12. The upper outer rim 41 and the lower outer rim 43, although they may include elastomeric materials, may serve as rigid bodies that may give the protective case 12 structural integrity, and that may serve as typical structures that a user may hold when holding the protective case 12, with an encased mobile device 10, in the user's hand.

Figure 4A:
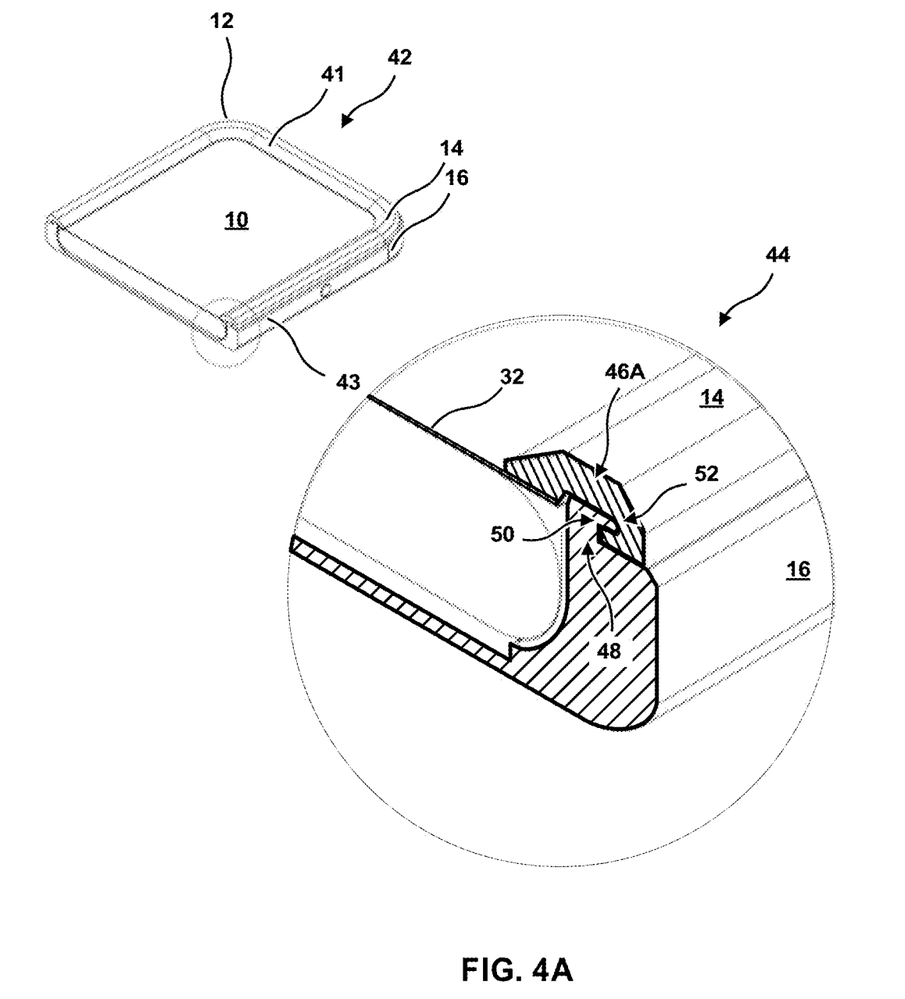
FIG. 4A is a cross-sectional view of a protective case, in a close-up view and a larger view.

FIG. 4A is a cross-sectional view 42 of a typical protective case 12, encasing an illustrative mobile device 10, along with a close-up cross-sectional view 44 showing an illustrative physical connection between a top section 14 and a bottom section 16. As shown in FIG. 4A, the protective case 12 is encasing the illustrative mobile device 10, and the top section 14 is engaged with the bottom section 16. When the top section 14 and the bottom section 16 are so engaged, the top section 14 and the bottom section 16 do not readily separate from one another with the application of force by a user. A user may, however, apply force to engage the top section 14 to the bottom section 16, or to disengage the top section 14 from the bottom section 16, typically without a need for tools.

Either the top section 14, or the bottom section 16, or both, includes one or more elastomeric portions that can deform from their original shapes upon application of force and generally resume their original shapes after the force is removed. In some embodiments, one section includes an elastomeric portion while the opposing section is composed of a rigid (non-elastomeric) material. For purposes of illustration, it will be assumed that, at the sites where the sections engage, the bottom section 16 is made of rigid material and the top section 14 includes elastomeric material.

As shown in FIG. 4A, the cross-section of the top section 14 (near the site of engagement to the bottom section 16) includes a generally C-shaped seal section. In other words, the top section 14 includes a concave or inward-curving portion 46A, sized to receive a correspondingly sized convex or outwardly bulging portion 48 on the bottom section 16. In FIG. 4, the convex portion 48 of the bottom section 16 includes a flange 50, and the concave section 46A of the top section 14 includes a sealing channel 52 sized to receive the flange 50. When the flange 50 is seated in the channel 52, the top section 14 and the bottom section 16 are engaged to one another. The engagement is not permanent, however; elastomeric material in the top section 14 enables the channel 52 to slip onto or off from the flange 50.

The particular engagement shown is illustrative of the kinds of structures by which the top section 14 may be engaged to the bottom section 16. A flange-and-channel arrangement is just one example of a variety of seal members that may be utilized. Other embodiments may include multiple flanges and channels, for example. A T-shaped convex portion, having opposing flanges oriented in opposite directions, and a concave portion having two channels to receive the two flanges, would be one example of an alternative arrangement. Shapes other than flanges and channels are also contemplated, including other shapes that can be snapped to or unsnapped from (or otherwise removably attached to or detached from) one another by application of force.

In some further embodiments, one or more O-rings (not shown) may be deployed at any site where the top section 14 may be engaged to the bottom section 16, to afford additional sealing. The O-rings may be a part of the top section 14 or the bottom section 16 or both. The O-ring may be attached to a section in any fashion, such as by an adhesive or by a groove that receives the O-ring with a friction fit. An O-ring—which may be made of an elastomer such as silicone, Buna-Nitrile, ethylene propylene diene monomer (EPDM) or similar material—may be compressed between the top section 14 and the bottom section 16, thereby improving the seal between the engaged sections and preventing the ingress of water, for example. O-rings generally are topologically toroidal elements, but need not be strictly circular in any cross-section. An O-ring ordinarily may have a ring shape similar to the shape and dimensions of the outer rim 41.

Figure 4B:
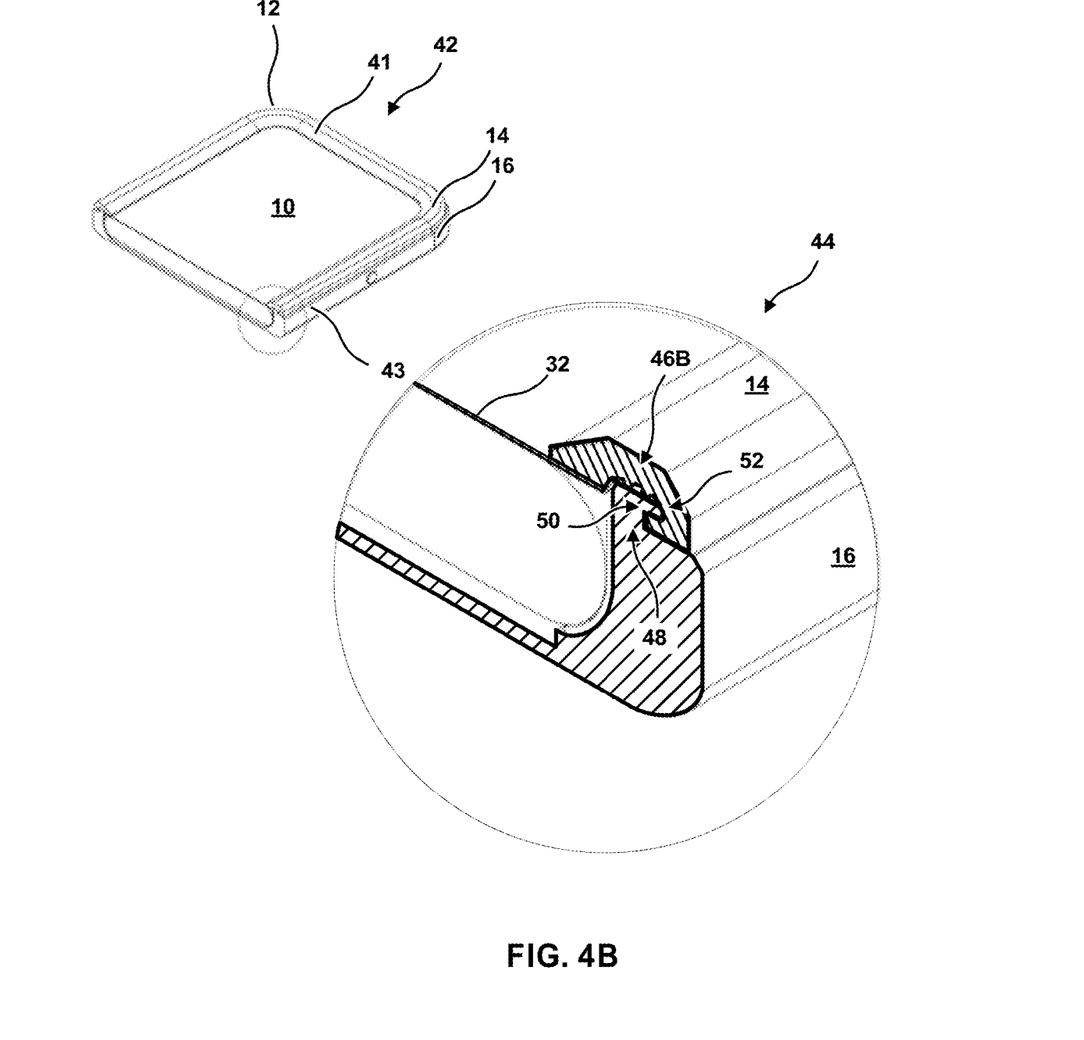
FIG. 4B is a cross-sectional view of a protective case, in a close-up view and a larger view, with an alternate embodiment.

An O-ring would be just one example of a seal bead that engages (or bears against) the concave portion 46A and/or the convex portion 48 and/or the flange 50 and/or the channel 52 when the top section 14 and the bottom section 16 are fully engaged with one another in a closed relationship. Other types of seal beads may be used as well. In some embodiments, the shape of the flange 50 and/or the channel 52 may include bead-like structures that perform in a fashion similar to an O-ring. One illustrative embodiment is shown in FIG. 4B, which is similar to FIG. 4A except in the shape of the concave or inward-curving portion 46B of the top section 14. In FIG. 4A, the concave section 46A essentially matches the shape of the convex portion 48 of the bottom section 16; in FIG. 4B, the concave section 46B has a different shape, with one or more bead-like structures that function to seal the engagement of the top section 14 and the bottom section 16, even though the concave section 46B essentially has fewer points of contact with the convex portion 48. The concave section 46B in FIG. 4B shows two bead-like structures, but any number of such structures is contemplated.

As indicated in FIGS. 4A and 4B, and also FIGS. 1, 2, and 3, the flange 50 of the top section 14 encircles the top section membrane 32 as part of the outer rim 41. In other words, the flange 50 is near the periphery of the top section 14, or proximate to an outer edge of the top section 14.

Figure 5:
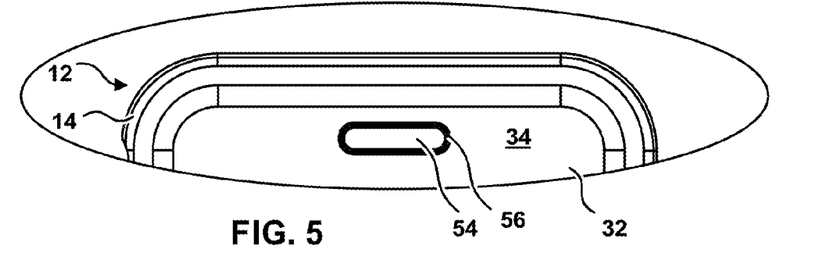
FIG. 5 is a plan view of part of a top section of a protective case, showing an optional feature.

FIG. 5 illustrates a further optional feature in the protective case 12. FIG. 5 shows part of the top section 14, with top section membrane 32 and main membrane section 34. FIG. 5 shows speaker membrane section 54, which may be physically coupled to the main membrane section 34 by a border attachment 56. Similar to the border attachment 38 associated with the home button feature 20 described previously, the border attachment 56 may bind the main membrane section 34 to the speaker membrane section 54 such that there is a hermetic seal of the main membrane section 34 and the speaker membrane section 54.

When the mobile device 10 is encased in the protective case 12, the speaker membrane section 54 may be disposed adjacent to a speaker (not shown) of a mobile device 10. The speaker membrane section 54 may have qualities different from those of the main membrane section 34, which may enable the speaker membrane section 54 to conduct sound, or to conduct sound with less distortion.

A similar feature may also be present in the protective case 12, disposed adjacent to a microphone (not shown) of a mobile device 10.

Figure 6:
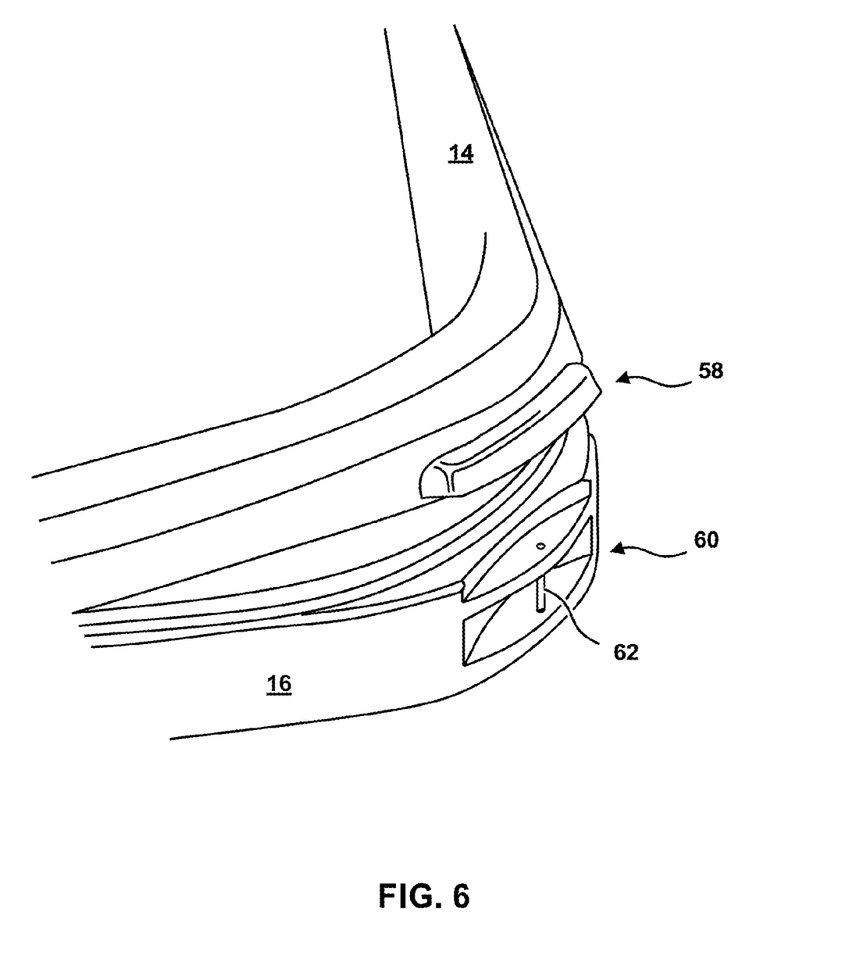
FIG. 6 is a perspective view of part of an illustrative protective case, showing optional features.

FIG. 6 illustrates further optional features in the protective case 12. One such feature is a leverage tab 58, depicted in FIG. 6 as a part of the top section 14. The leverage tab 58 enables a user to hold the bottom section 16 and apply force to the top section 14 to disengage the top section 14 from the bottom section 16. In FIG. 6, the top section 14 is shown as beginning to disengage from the bottom section 16, the disengagement occurring proximate to the leverage tab 58.

A further optional feature is a hardpoint 60, which is a portion of the protective case 12 that is firmly affixed as a part of, and not detachable from, the protective case 12. In FIG. 6, the hardpoint 60 is a part of the bottom section 16. The hardpoint represents a structure that is not easily deformed or damaged or broken, and that may be used for a variety of purposes. A typical operation of a hardpoint is to serve as a point of attachment to the protective case 12 for one or more accessories. The hardpoint 60 in FIG. 6 includes an anchor post 62, to which may be attached a wrist strap for example, or a selfie stick, or a stylus, or any of several other kinds of accessories.

In a typical embodiment and implementation, a matching protective case 12 is selected for a mobile device 10. The top section 14 and the bottom section 16 of the protective case 12 are in an open relationship, so that the mobile device 10 may be received. The mobile device 10 may be placed against the bottom section 16 (for example), and the top section 14 may then be placed adjacent to the mobile device 10. Through the application of force, the user may press the outer rims of the top section 14 and the bottom section 16 toward each other. This application of force causes at least a portion of an elastomeric member of the top section 14 and/or the bottom section 16 to deform, and engage with a mating structure of the opposing section, and resume its original shape. When the engagement is complete around the periphery of the top section 14 and the bottom section 16, the top section 14 and the bottom section 16 are in a closed relationship and the mobile device 10 is encased in the protective case 12.

When the mobile device 10 is encased in the protective case 12, most or all functionality of the mobile device 10 is preserved. A user may interact with the mobile device 10 through touch or sight or sound or wireless charging (for example), with the features of the protective case 12 enabling such interaction. At the same time, the protective case 12 affords protection to the mobile device 10 from any number of environmental concerns. The protective case 12 may further afford functionality to the mobile device 10 that the mobile device may not have had, such as a hardpoint for attachment of an accessory or an aesthetic appeal.

When the mobile device 10 is encased in the protective case 12, the seal between the top section 14 and the bottom section 14 may be airtight. In some embodiments, the seal between the top section 14 and the bottom section 14 may be water-resistant, or waterproof. In some embodiments, the sealing features may be such that the protective case 12 may be waterproof to a particular depth of water. In further embodiments, the protective case 12 may be constructed from buoyant materials, such that a mobile device 10 encased in the protective case 12 will float on water.

Although many prospective advantages have been mentioned or described already, the protective case 12 may realize further benefits. The protective case 12 may, for example, afford greater ease of use of the mobile device 10, and may be easier to grasp than the mobile device 10, or may make the mobile device 10 easier to place on a stand, or may prevent the mobile device 10 from rocking or sliding when placed on a surface such as a table. The elastomeric materials in the protective case 12 may have functionality beyond engaging the top section 14 and the bottom section 16, but may contribute to shock absorption.

The embodiments described above and shown in the drawings are intended to be examples only. Alterations, modifications and variations can be effected to the particular embodiments without departing from the scope of the concept, which is defined by the claims appended hereto.

What is claimed is:

1. A mobile device protective case for encasing a mobile device therein, the mobile device protective case comprising:
   a bottom section comprising a lower rim having a circumferential outer edge defining a flange; and
   an elastomeric top section comprising an upper rim having a circumferential outer edge defining an elastomeric sealing channel,
   wherein an airtight seal is created between the elastomeric top section and the bottom section when the flange sealingly engages the elastomeric sealing channel, sealingly encasing the mobile device between the elastomeric top section and the bottom section.

2. The mobile device protective case of claim 1, wherein the bottom section further comprises a control switch feature, and wherein the control switch feature is hermetically sealed to the bottom section.

3. The mobile device protective case of claim 1, wherein the flange is a first flange, wherein the bottom section comprises the first flange and a second flange, and wherein the first flange and the second flange are oriented in opposite directions.

4. The mobile device protective case of claim 1, wherein the flange and the elastomeric sealing channel are adapted to engage upon the application of a first force, and wherein the flange and the elastomeric sealing channel are adapted to disengage upon the application of a second force.

5. The mobile device protective case of claim 1, wherein the top section and the bottom section, when in the closed relationship, create a void, wherein the top section and the bottom section are hermetically sealed, and wherein the hermetic seal prevents air from passing into the void from an external environment.

6. The mobile device protective case of claim 1, wherein the bottom section comprises an interface cover tab, the interface cover tab comprising a plug portion, a grip portion, and a hinge portion.

7. The mobile device protective case of claim 1, wherein
the top section is configured to engage the bottom section in a closed relationship;
the top section and the bottom section are sized and shaped to encase the mobile device when in the closed relationship;
the top section membrane includes a first membrane portion and a second membrane portion;
the first membrane portion comprises a first set of qualities; and
the second membrane portion comprises a second set of qualities.

8. The mobile device protective case of claim 7, wherein a set of qualities comprises at least one of transparency, thickness, flexibility, resilience, construction materials, electrical conductivity, and thermal conductivity.

9. The mobile device protective case of claim 7, wherein the first membrane portion is attached to the second membrane portion by a border attachment.

10. The mobile device protective case of claim 9, wherein the border attachment comprises an adhesive.

11. The mobile device protective case of claim 7, wherein the first membrane portion is configured to allow biometric passthrough.

12. The mobile device protective case of claim 1, wherein the elastomeric top section further comprises a top section membrane, and wherein the elestomeric top section and the top section membrane are a unitary structure.

* * * * *